United States Patent
Fit-Florea et al.

(10) Patent No.: US 10,908,878 B2
(45) Date of Patent: Feb. 2, 2021

(54) DYNAMIC DIRECTIONAL ROUNDING

(71) Applicant: NVIDIA Corporation, Santa Clara, CA (US)

(72) Inventors: Alex Fit-Florea, Los Altos Hills, CA (US); Boris Ginsburg, Mountain View, CA (US); Pooya Davoodi, Santa Clara, CA (US); Amir Gholaminejad, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 61 days.

(21) Appl. No.: 16/200,325

(22) Filed: Nov. 26, 2018

(65) Prior Publication Data

US 2020/0167125 A1    May 28, 2020

(51) Int. Cl.
*G06F 7/499* (2006.01)
*G06F 7/483* (2006.01)

(52) U.S. Cl.
CPC .......... *G06F 7/49957* (2013.01); *G06F 7/483* (2013.01)

(58) Field of Classification Search
CPC .. G06F 7/49957; G06F 7/483; G06F 7/49947; G06F 9/30076; G06F 9/30014; G06N 3/084; G06N 3/063
USPC ........................................ 708/495
See application file for complete search history.

(56) References Cited

U.S. PATENT DOCUMENTS

| | | | | |
|---|---|---|---|---|
| 5,373,461 A | * | 12/1994 | Bearden | G06F 7/485 708/205 |
| 6,684,232 B1 | * | 1/2004 | Handlogten | G06F 7/483 708/204 |
| 2010/0250635 A1 | * | 9/2010 | Osada | G06F 7/5443 708/205 |

FOREIGN PATENT DOCUMENTS

WO    2018189728 A1    10/2018

OTHER PUBLICATIONS

Gupta et al., "Deep Learning with Limited Numerical Precision," Proceedings of the 32nd International Conference on Machine Learning, vol. 37, 2015, 10 pages.
Courbariaux et al., "Training Deep Neural Networks With Low Precision Multiplications," Accepted as a workshop contribution at International Conference on Learning Representations 2015, 10 pages. Retrieved from arXiv:1412.7024v5 [cs.LG] Sep. 23, 2015.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

(Continued)

*Primary Examiner* — Tan V Mai
(74) *Attorney, Agent, or Firm* — Davis Wright Tremaine LLP

(57) ABSTRACT

A method, computer readable medium, and system are disclosed for rounding floating point values. Dynamic directional rounding is a rounding technique for floating point operations. A floating point operation (addition, subtraction, multiplication, etc.) is performed on an operand to compute a floating point result. A sign (positive or negative) of the operand is identified. In one embodiment, the sign determines a direction in which the floating point result is rounded (towards negative or positive infinity). When used for updating parameters of a neural network during back- (Continued)

propagation, dynamic directional rounding ensures that rounding is performed in the direction of the gradient.

24 Claims, 11 Drawing Sheets

(56) References Cited

OTHER PUBLICATIONS

Cloutier et al., "Hardware Implementation of the Backpropagation without Multiplication," Proceedings of the Fourth International Conference on Microelectronics for Neural Networks and Fuzzy Systems, Sep. 26, 1994, 10 pages.

Extended European Search Report dated Apr. 23, 2020, Patent Application No. 19211505.3-1203, 11 pages.

Guo, "A survey on methods and theories of quantized neural networks," arXiv preprint arXiv:1808.04752, Aug. 13, 2018, 18 pages.

Li et al., "Training Quantized Nets: A Deeper Understanding," Advances in Neural Information Processing Systems, Dec. 4, 2017, 18 pages.

\* cited by examiner

DYNAMIC DIRECTIONAL ROUNDING

FIELD OF THE INVENTION

The present disclosure relates to rounding numerical values, and more particularly, to rounding floating point values.

BACKGROUND

Conventional rounding techniques are defined by the IEEE (Institute of Electrical and Electronics Engineers) standard (round to nearest, round towards zero, and round towards positive infinity, and round towards negative infinity). More recently, stochastic rounding techniques have been developed that rely on a random value for rounding floating point numbers. To this end, stochastic rounding techniques require generating random values. There is a need for addressing these issues and/or other issues associated with the prior art.

DETAILED DESCRIPTION

Figure 1A:
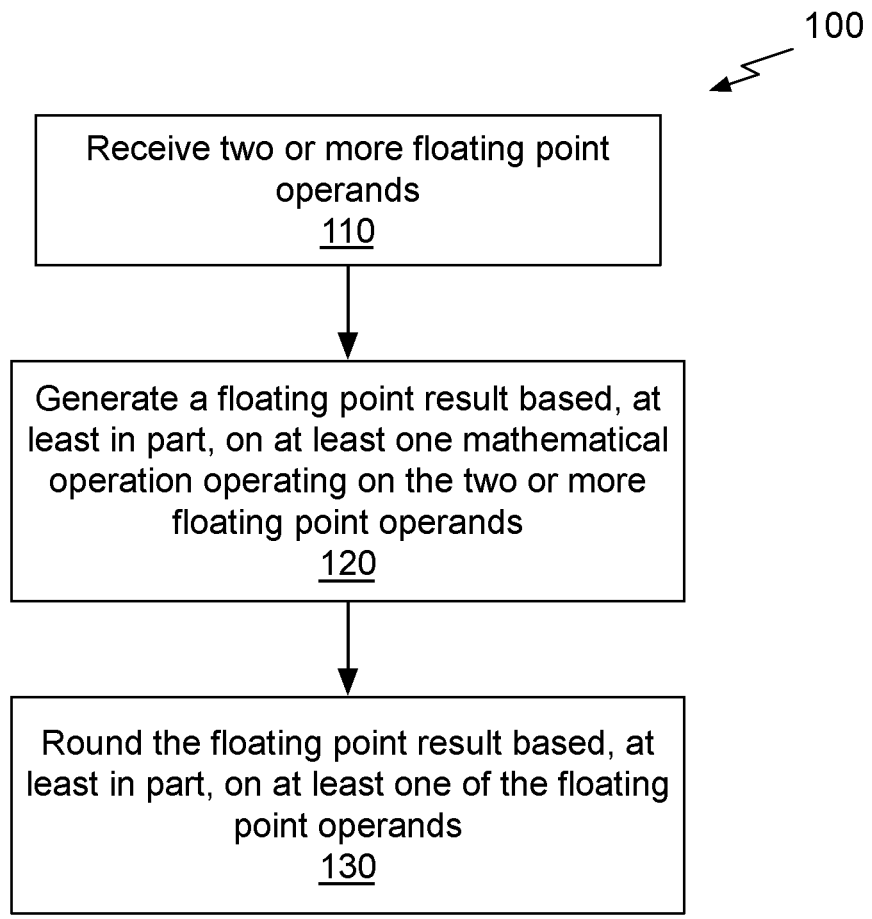
FIG. 1A illustrates a flowchart of a method for rounding a floating point result, in accordance with one embodiment.

FIG. 1A illustrates a flowchart of a method 100 for rounding a floating point result, in accordance with one embodiment. Although method 100 is described in the context of a processing unit, the method 100 may also be performed by a program, custom circuitry, or by a combination of custom circuitry and a program. In one embodiment, the method 100 may be executed by a GPU (graphics processing unit), CPU (central processing unit), or any processor capable of performing arithmetic computations. Furthermore, persons of ordinary skill in the art will understand that any system that performs method 100 is within the scope and spirit of embodiments described herein.

At step 110, two or more floating point operands are received. In one embodiment, the two or more floating point operands are represented in a floating point format comprising a sign, exponent, and a mantissa. In one embodiment, the two or more floating point operands are specified by a program instruction. In one embodiment, at least one of the two or more floating point operands is an expression. In one embodiment, at least one of the two or more floating point operands is an arithmetic expression. In one embodiment, the program instruction is an arithmetic operation instruction.

At step 120, a floating point result is generated based, at least in part, on at least one mathematical operation operating on the two or more floating point operands. In one embodiment, the at least one mathematical operation is specified by a program instruction that includes the two or more floating point operands. In one embodiment, the mathematical operation comprises addition. In one embodiment, the mathematical operation comprises subtraction. In one embodiment, the mathematical operation comprises multiplication.

At step 130, the floating point result is rounded based, at least in part, on at least one of the floating point operands. In one embodiment, rounding is performed without requiring generation of a random value. In one embodiment, a sign of one of the floating point operands is identified. In one embodiment, the one of the floating point operands is specified by a program instruction. In one embodiment, the one of the floating point operands is specified by a position (e.g., first, second, last) or ordering within a program instruction and the position is fixed or programmable. In one embodiment, the one of the floating point operands is specified by a setting, and the setting may be fixed or programmed. In one embodiment, the setting specifies the first operand is the one operand upon which the floating point result rounding is based.

In one embodiment, the floating point result is rounded in a direction corresponding to the sign of one of the floating point operands. In one embodiment, the floating point result, generated based on the at least one mathematical operation, is rounded in a dynamically determined direction, namely the direction of the sign. In one embodiment, when the sign is positive, the floating point result is rounded in the positive direction. In one embodiment, when the sign is positive, the floating point result is rounded in the direction of positive infinity. In one embodiment, when the sign is negative, the floating point result is rounded in the negative direction.

In one embodiment, when the sign is positive and a result sign of the floating point result is also positive, the floating point result is rounded in the positive direction. In one embodiment, when the sign is positive and the result sign is negative, the floating point result is rounded in the positive direction. In one embodiment, when the sign and the result sign are both negative, the floating point result is rounded in the negative direction. In one embodiment, when the sign is negative and the result sign is positive, the floating point result is rounded in the negative direction. In other words, in one embodiment, the rounding may exclusively follow the sign of operand, and may be independent of the sign of the result.

In one embodiment, the floating point result is rounded in a direction corresponding to one or more bits of the one of the floating point operands. One or more bits of the one of the floating point operands may be set TRUE or FALSE to control the rounding direction. Furthermore, changing the value of the operand may, in turn, change the value of the floating point result.

In one embodiment, the rounding is performed based, at least in part, on a value of at least one of the floating point operands. In one embodiment, if the value is within a first numerical range, the floating point result is rounded in the positive direction. In one embodiment, if the value is within a second numerical range, the floating point result is rounded in the negative direction. In one embodiment, the first and second numerical ranges may be fixed or programmed. In one embodiment, the first and second numerical ranges overlap. In one embodiment, the first and second numerical ranges are exclusive.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In one embodiment, reducing precision in representing numerical values for mathematical computations may be beneficial in certain circumstances. 32-bit floating point values can be replaced with less precise 16-bit floating point values to reduce circuitry, power, and bandwidth for training of neural networks. The reduced precision values require only half the bandwidth during data transmission and less than half the die area and power consumption compared with using full precision values. However, the range of values that can be represented using a 16-bit floating point format is much smaller than the range of values that can be represented using a 32-bit floating point format. Numbers smaller than the smallest value represented by the 16-bit floating point format are lost (e.g., turned to zero) and accuracy may be reduced.

Stochastic rounding is a technique that is conventionally used to extend numerical range. With traditional round-to-nearest rounding, numbers are deterministically rounded up or down, for example values between 0.5 and 1 are rounded up to 1, values below 0.5 are always rounded down to 0. With stochastic rounding, the rounding is instead probabilistic. With stochastic rounding, an individual rounding event can actually introduce more error, but on average over a long sequence of accumulations, the result will have less error. For example, when accumulating 1000 numbers with value 0.1 with traditional rounding after each number is accumulated, the result will be zero, whereas with stochastic rounding the result should be closer to the correct answer of 100.

Thus, while stochastic rounding is preferable when applying an accumulate and round operation over a long series of numerical values, the challenge is implementing the random rounding behavior of stochastic rounding efficiently in software or hardware. One method could be to generate a random number for each rounding operation, but that is expensive in terms of additional circuitry and/or power consumption. In one embodiment, such expense may be avoided using the method 100 of FIG. 1A, and/or any of the other features disclosed below. Again, however, it should be noted that such expense avoidance is merely optional, and at least one embodiment is contemplated where such feature is omitted.

During training of a neural network, in accordance with one embodiment, parameters of the neural network are continuously or periodically updated using backpropagation. The parameters are updated based on gradients to reduce differences between an output of the neural network compared with a desired (ground truth) output. In one embodiment, a gradient descent technique is used to minimize a cost function and the parameters are updated in the direction of the gradients. As training progresses and the cost function is minimized, the gradients generally become smaller and smaller. Magnitudes of the gradients may become too small to change the value of the parameters due to limited precision of the parameters. When the gradients become too small, movement of the parameters in the direction specified by the gradients is not achieved.

In one embodiment, dynamic directional rounding may be used to update parameters of a neural network during backpropagation, ensuring that the parameters are changed in the direction of the gradient. In one embodiment, dynamic directional rounding may be used to ensure that a floating point result is rounded in the direction defined by the sign of an operand. In one embodiment, dynamic directional rounding may be used to ensure that a floating point result is rounded in the direction defined by a value of an operand. In one embodiment, dynamic directional rounding may be used to ensure that a floating point result is rounded in the direction defined by an operand. In one embodiment, the operand is based on the gradient and the floating point result is a parameter.

Figure 1B:
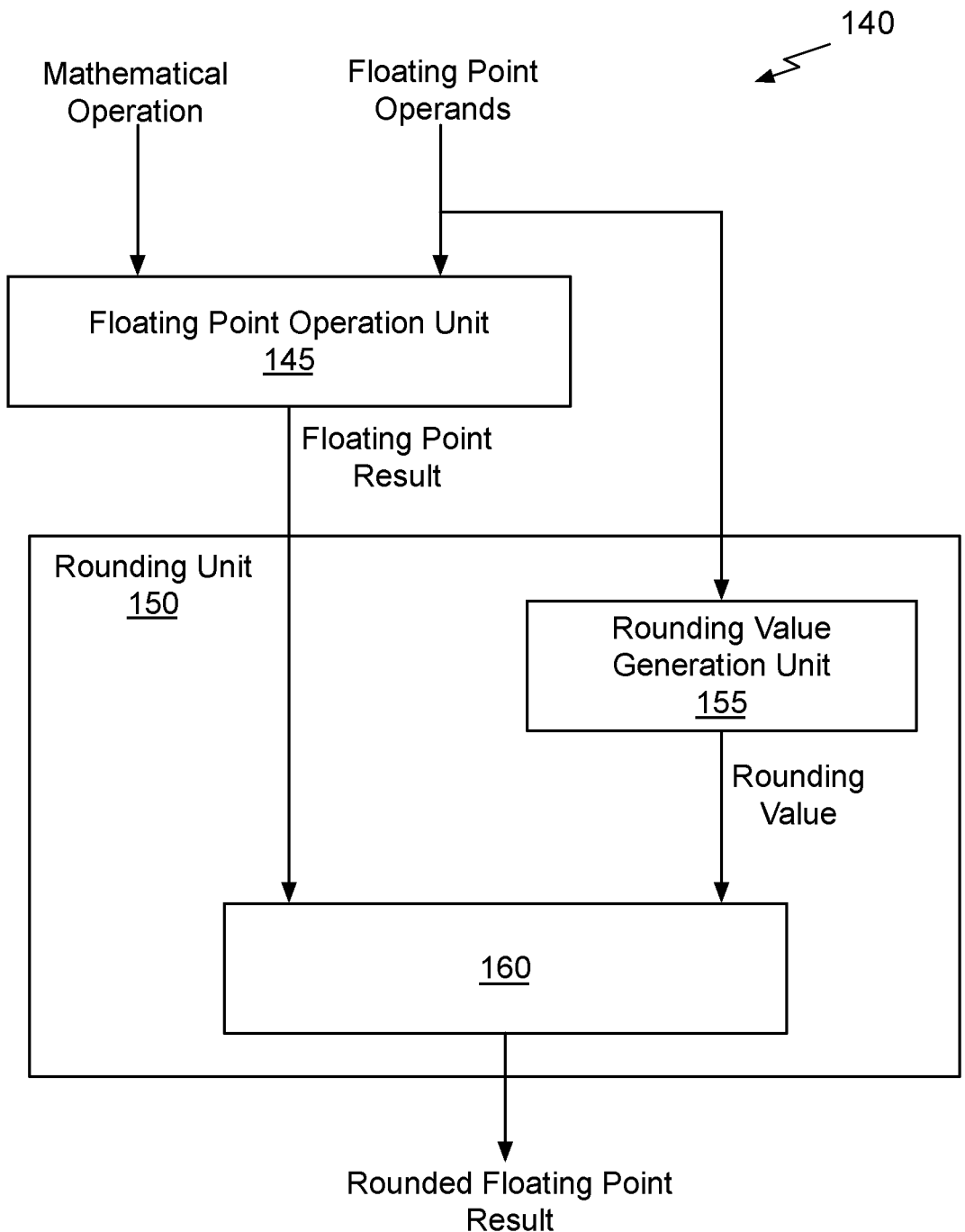
FIG. 1B illustrates a block diagram of a system, in accordance with one embodiment.

FIG. 1B illustrates a block diagram of a system 140, in accordance with one embodiment. In one embodiment, the system 140 includes a floating point operation unit 145 and a rounding unit 150. Although the system 140 is described in the context of processing units, one or more of the units, such as the floating point operation unit 145 and the rounding unit 150, may be implemented as a program, custom circuitry, or by a combination of custom circuitry and a program. In one embodiment, the system 140 may be implemented by a GPU (graphics processing unit), CPU (central processing unit), or any processor capable of performing floating point operations. Furthermore, persons of ordinary skill in the art will understand that any system that performs the operations of the system 140 is within the scope and spirit of embodiments described herein.

The floating point operation unit 145 receives the two or more floating point operands and generates a floating point result based, at least in part, on the at least one mathematical operation operating on the two or more floating point operands. In one embodiment, the two or more floating point operands are each represented using an IEEE floating point format.

In one embodiment, dynamic directional rounding is used to perform an addition operation. For the addition operation A=B+C, the result, A, differs from either of the inputs B or C provided the operand sign is either positive or negative. When C is specified as the operand used for rounding, the sum B+C will be rounded in the direction of the sign of C. When C equals zero, A=B. Otherwise, when C>0, A=B+C+V, where V is a rounding value, and when C<0, A=B+C−V. Therefore, when C equals a small non-zero number, dynamic directional rounding produces A>B when the sign of C is positive and A<B when the sign of C is negative. In one embodiment, V equals one unit in the last place (ulp), unit of least precision, or least significant bit (lsb). In other words, a magnitude of the rounding value is the smallest value that can be represented using the number of bits in the mantissa of one of the floating point operands. When the rounding value V is 1 ulp, A=A+ulp for C>0, A=A−ulp for C<0, and A=A for C=0.

The rounding unit 150 includes a rounding value generation unit 155 and a unit 160. In one embodiment, the unit 160 is an accumulator configured to perform signed floating point addition and the rounding value is a signed floating point number. In one embodiment, the unit 160 is an adder/subtractor configurable to perform addition or subtraction based on a control signal and the rounding value comprises an unsigned floating point number and control signal, where the unsigned floating point number is added to or subtracted from the floating point result according to the control signal.

In one embodiment, the rounding unit 150 receives the floating point result including at least a mantissa and at least one of the floating point operands. The rounding value generation unit 155 generates a rounding value based on the operand sign. In one embodiment, the rounding value is a unit in the last place (ulp), unit of least precision, or least significant bit (lsb) for one of the floating point operands. In one embodiment, the rounding value is positive when a value of one of the floating point operands is within a first numerical range and the rounding value is negative when the value of one of the floating point operands is within a second numerical range. The magnitude of the rounding value may be fixed, computed, or programmed.

In one embodiment, the rounding unit 150 receives the floating point result including at least a mantissa and the (operand) sign of at least one of the floating point operands. The rounding value is positive when the operand sign is positive and the rounding value is negative when the operand sign is negative. The magnitude of the rounding value may be fixed, computed, or programmed. In one embodiment, the rounding unit 150 may be configured to perform dynamic directional rounding and conventional IEEE 754-2008 rounding.

In one embodiment, the unit 160 sums the rounding value with the floating point result to compute a rounded floating point result. In one embodiment, the unit 160 receives the rounding value represented in an unsigned format and performs addition when the operand sign is positive and performs subtraction when the operand sign is negative. In one embodiment, the unit 160 normalizes the accumulated result when the accumulated result overflows or underflows. In one embodiment, the floating point result and the rounded floating point result each include a 23-bit mantissa and a sign of a floating point format number. In one embodiment, the floating point result and the rounded floating point result each include a 15-bit mantissa. In one embodiment, the floating point result and the rounded floating point result each include a 7-bit mantissa.

In one embodiment, dynamic directional rounding is enabled/disabled for one operand for a floating point operation. In one embodiment, dynamic directional rounding is enabled/disabled for a floating point operation program instruction. In one embodiment, a dedicated program instruction enables/disables dynamic directional rounding for one or more floating point operations. In one embodiment, dynamic directional rounding may be selectively enabled for program instructions that perform arithmetic operations (e.g., multiply accumulate, sum, etc.).

In one embodiment, arithmetic operations may be performed including, but not limited to those listed below in Table 1.

TABLE 1

1. ADD: z = x + y, then sign(y) defines rounding mode, but sign of other arguments (x) is irrelevant
2. ACCUMULAT_ADD: z += y sign(y) defines rounding mode, but sign of z is irrelevant
3. Fused Multiply Add, when rounding mode depends on the sign of intermediate result, but not on the sign of operands: Z = z + x*y: rounding mode depends on the sign(x*y).

Figure 1C:
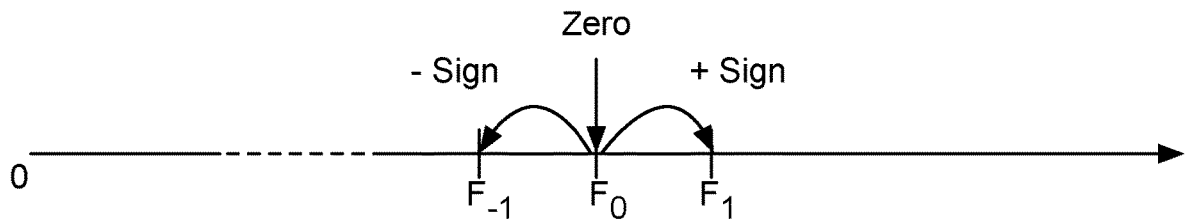
FIG. 1C illustrates a conceptual diagram of rounding a floating point result according to a sign, in accordance with one embodiment.

FIG. 1C illustrates a conceptual diagram of rounding a floating point result according to a sign, in accordance with one embodiment. Precision of the floating point numbers is limited and therefore, when the floating point result generated by the floating point operation unit 145 is not exactly equal to a quantized value, such as $F_{-1}$, $F_0$, or $F_1$, the floating point result is rounded towards either $F_{-1}$ or $F_1$. The quantized values can be represented exactly according to the precision of the floating point format. The distance between each quantized value is 1 ulp, so that $F_1=F_0+1$ ulp and $F_{-1}=F_0-1$ ulp. As shown in FIG. 1C, when the floating point result is a positive value that lies between $F_{-1}$ and $F_0$ or between $F_0$ and $F_1$ along the positive axis from zero to positive infinity, the floating point result is rounded to generate a rounded floating point result equal the quantized value $F_{-1}$, $F_0$, or $F_1$.

When dynamic directional rounding is used, in one embodiment, the rounded floating point result is based, at least in part, on the sign of the at least one of the floating point operands input to the floating point operation unit 145. When the operand is zero, the sign is neither positive nor negative, the floating point result and the rounded floating point result both equal $F_0$. When the sign of the operand is positive, the floating point result is rounded in the positive direction toward $F_1$ or positive infinity. For a positive sign, floating point results greater than $F_0$ are rounded so the rounded floating point result equals $F_1$ and floating point results less than $F_0$ are rounded so the rounded floating point result equals $F_0$. When the sign of the operand is negative, the floating point result is rounded in the negative direction toward $F_{-1}$ or negative infinity. For a negative sign, floating point results greater than $F_0$ are rounded so the rounded floating point result equals $F_0$ and floating point results less than $F_0$ are rounded so the rounded floating point result equals $F_{-1}$.

In one embodiment, the floating point result is computed as a sum $W_1=W_0+D_0$, where $W_0$ is a weight of a neural network that is updated by a gradient $D_0$ during backpropagation to generate $W_1$. When the magnitude of $D_0$ is less than 2 ulp of $W_0$, the floating point result computed for $W_1$ may equal $W_0$ when conventional rounding is used. Even when stochastic rounding is used, the probability of computing a $W_1$ that is different from $W_0$ is low. In contrast, dynamic directional rounding ensures that the value of $W_1$ does not equal $W_0$, except when $D_0$ equals zero. Therefore, the computed weight $W_1$ moves in the direction of the gradient, increasing the likelihood that the cost function will progress toward the global minimum and not remain in a local minimum or plateau. In one embodiment, $D_0$ is replaced with an expression (e.g., $D_0*A_0$) and the sign of the evaluated expression controls the direction of rounding for $W_1=W_0+(D_0*A_0)$.

In one embodiment, $W_0=1.2531e12$, $D_0=1.0001e2$, and the floating point result $W_0+D_0=1.25310000010001e12$. $F_{-1}$ is 1.2530e12, $F_0$ is 1.2531e12, $F_1$ is 1.2532e12, so the floating point result lies between $F_0$ and $F_1$. When represented using the floating point precision of the operands, $W_0+D_0=W_0$ because the magnitude of $D_0$ is small compared with $W_0$. In one embodiment, the rounding value is 1 ulp. When the floating point result is rounded in the positive direction, based on the sign of $D_0$, the rounded floating point result $W_1$ is computed to equal $F_1$. When the sign of $D_0$ is negative, the floating point result is rounded in the negative direction and the rounded floating point result is computed to equal $F_0$. $W_1$ is set to equal $F_0$ when $D_0$ is zero.

Figure 1D:
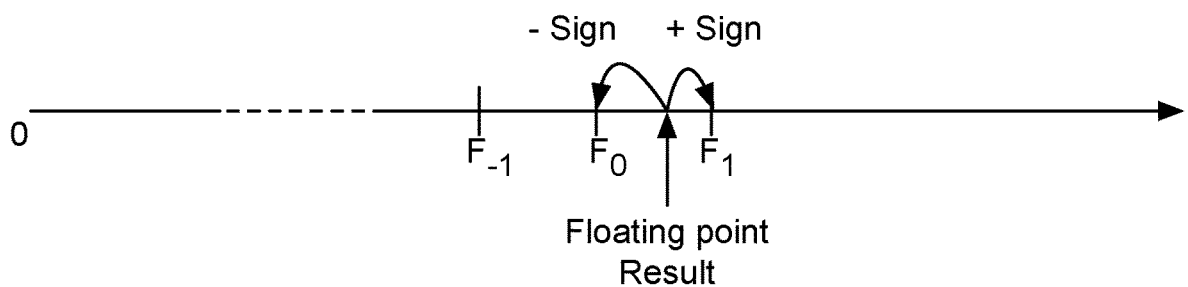
FIG. 1D illustrates a conceptual diagram of rounding a floating point result according to a sign, in accordance with one embodiment.

FIG. 1D illustrates a conceptual diagram of rounding a floating point result according to a sign, in accordance with one embodiment. As shown in FIG. 1D, the floating point result is a positive value that lies between $F_0$ and $F_1$ along the positive axis from zero to positive infinity. When the (operand) sign is positive, the floating point result is rounded in the positive direction toward $F_1$ and the rounded floating point result equals $F_1$. When the (operand) sign is negative, the floating point result is rounded in the negative direction toward $F_{-1}$ and the rounded floating point result equals $F_0$.

Figure 1E:
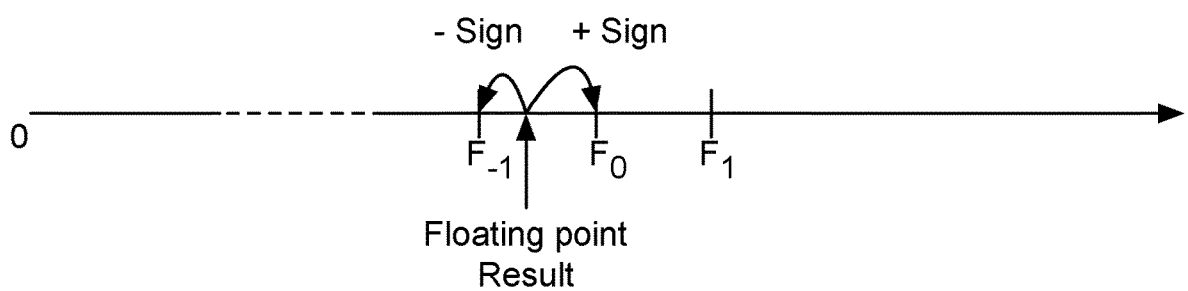
FIG. 1E illustrates a conceptual diagram of rounding a floating point result according to a sign, in accordance with one embodiment.

FIG. 1E illustrates a conceptual diagram of rounding a floating point result according to a sign, in accordance with one embodiment. As shown in FIG. 1E, the floating point result is a positive value that lies between $F_{-1}$ and $F_0$. When the (operand) sign is positive, the floating point result is rounded in the positive direction toward $F_1$ and the rounded floating point result equals $F_0$. When the (operand) sign is negative, the floating point result is rounded in the negative direction toward $F_{-1}$ and the rounded floating point result equals $F_{-1}$.

Figure 2A:
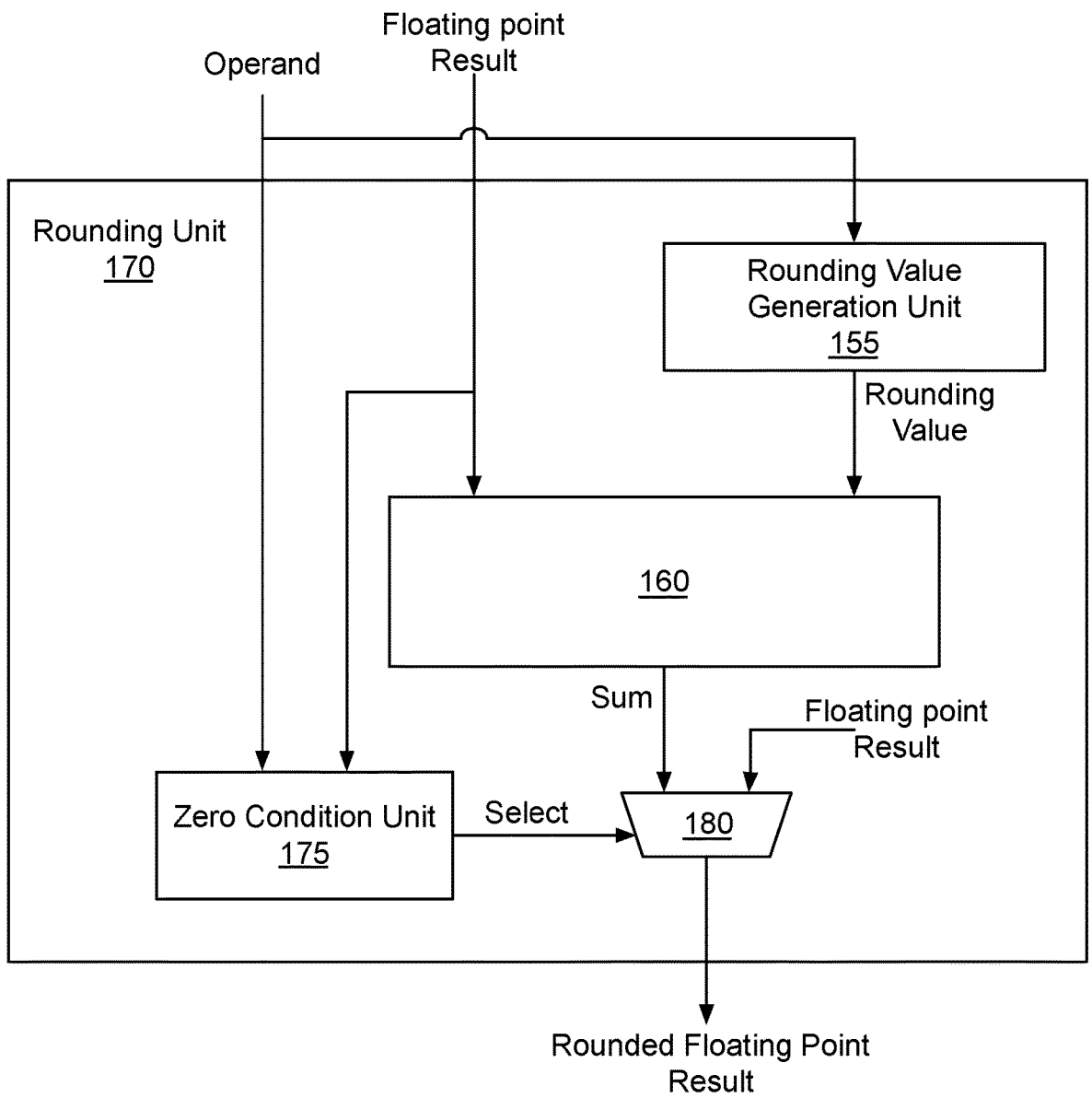
FIG. 2A illustrates a block diagram of a rounding unit, in accordance with one embodiment.

FIG. 2A illustrates a block diagram of a rounding unit 170, in accordance with one embodiment. The rounding unit 170 includes the rounding value generation unit 155, the unit 160, a zero condition unit 175, and a multiplexer 180. Although the rounding unit 170 is described in the context of processing units, one or more of the units (e.g., the rounding value generation unit 155, the unit 160, and the zero condition unit 175) may be implemented as a program, custom circuitry, or by a combination of custom circuitry and a program. In one embodiment, the rounding unit 170 may be implemented by a GPU (graphics processing unit), CPU (central processing unit), or any processor capable of performing floating point operations. Furthermore, persons of ordinary skill in the art will understand that any system that performs the operations of the rounding unit 170 is within the scope and spirit of embodiments described herein.

In one embodiment, the rounding unit 170 receives at least one of the floating point operands and the floating point result includes at least a mantissa. As previously described, the rounding value generation unit 155 generates a rounding value based on the operand sign. In one embodiment, the rounding value is also generated based on the ulp or lsb of one of the floating point operands that was used to generate the floating point result.

In one embodiment, the unit 160 sums the rounding value with the floating point result to compute a sum that is input to the multiplexer 180. The multiplexer 180 also receives the floating point result as an input. The zero condition unit 175 outputs a select signal to the multiplexer 180 that is used to select either the sum or the floating point result as the rounded floating point result. In one embodiment, the zero condition unit 175 receives the operand including the operand sign and determines if the operand equals zero. When the operand equals zero, the select signal is used by the multiplexer 180 to select the floating point result as the rounded floating point result. Otherwise, when the operand does not equal zero, the select signal is used by the multiplexer 180 to select the sum as the rounded floating point result.

In one embodiment, the zero condition unit 175 determines if the floating point result is represented exactly. The floating point result is represented exactly when the floating point result equals a quantized value. When the floating point result is represented exactly, the select signal is used by the multiplexer 180 to select the floating point result as the rounded floating point result. Otherwise, when the floating point result is not represented exactly, the zero sign signal is used by the multiplexer 180 to select the sum as the rounded floating point result.

Figure 2B:
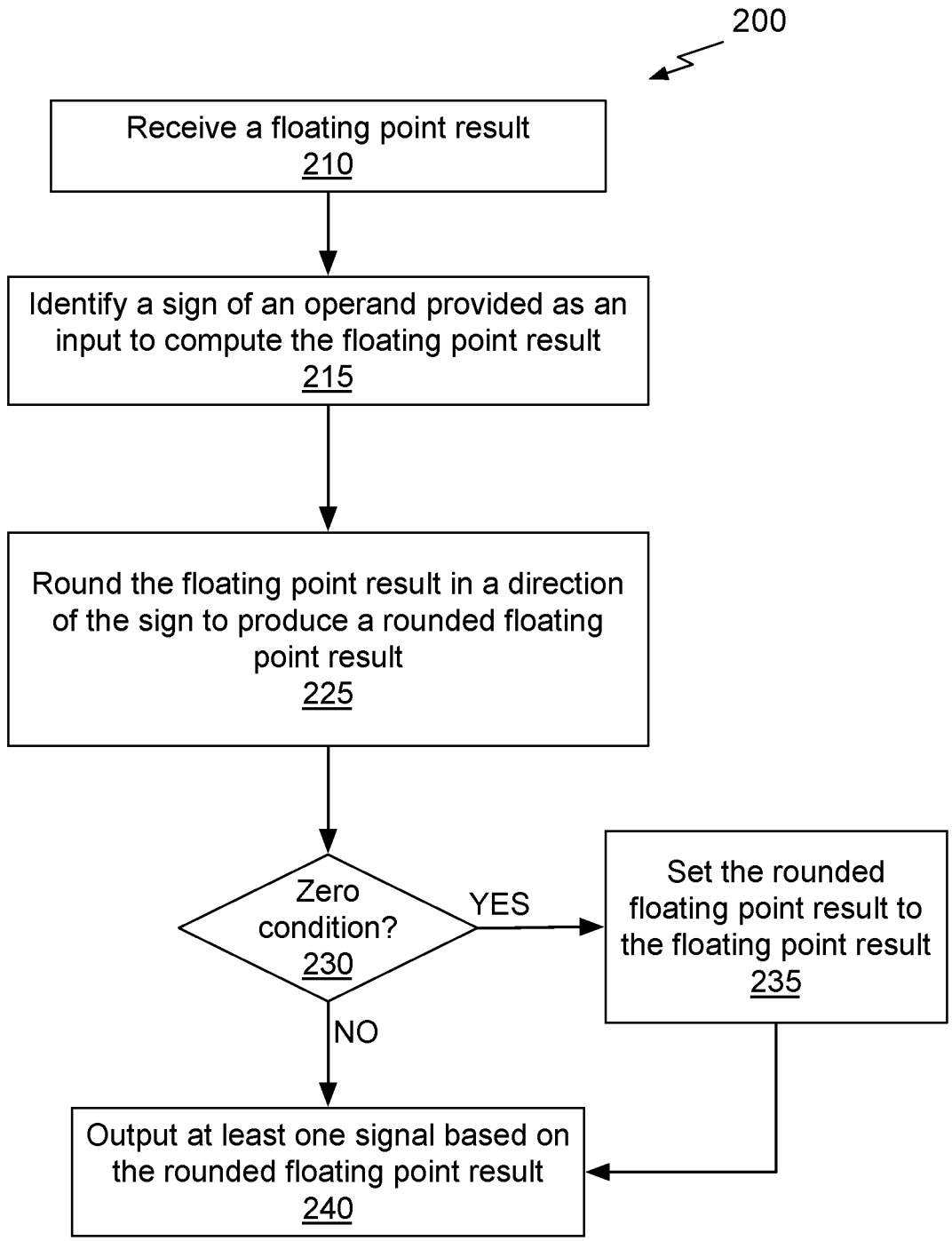
FIG. 2B illustrates a flowchart of a method for rounding a floating point result, in accordance with one embodiment.

FIG. 2B illustrates a flowchart of a method 200 for rounding a floating point result, in accordance with one embodiment. Although method 200 is described in the context of the rounding unit 170, the method 200 may also be performed by a program, custom circuitry, or by a combination of custom circuitry and a program. In one embodiment, the method 200 may be executed by a GPU (graphics processing unit), CPU (central processing unit), or any processor capable of performing arithmetic computations. Furthermore, persons of ordinary skill in the art will understand that any system that performs method 200 is within the scope and spirit of embodiments described herein.

At step 210, the rounding unit 170 receives a floating point result. In one embodiment, the floating point result is represented in a floating point format comprising a sign, exponent, and a mantissa. In one embodiment, the floating point result is generated by executing a program instruction. In one embodiment, the program instruction is an arithmetic operation instruction.

At step 215, a sign of an operand provided as an input to compute the floating point result is identified. In one embodiment, the operand is provided as an input to a program instruction that is executed to generate the floating point result. In one embodiment, the operand is an expression that is evaluated and the sign is a sign of the evaluated expression. In one embodiment, the expression is an arithmetic expression.

At step 225, the floating point result is rounded in a direction of the sign, by the rounding unit 170, to produce a rounded floating point result. In one embodiment, the floating point result is rounded in a direction corresponding to the sign.

At step 230, the zero condition unit 175 determines if the zero condition is met, and, if so, at step 235, the rounded floating point result is set to the floating point result by the multiplexer 180. If, at step 230, the zero condition unit 175 determines that the zero condition is not met, then the rounded floating point result is unchanged. At step 240, at least one sign is output based on the rounded floating point result. In one embodiment, the rounded floating point result is at least a portion of an updated weight value computed during training of a neural network and the rounded floating point result is provided to the neural network.

In one embodiment, when dynamic directional rounding is used during training of a neural network, magnitudes of the updated weight values are changed and the updated weight values are changed in the direction of the sign of the gradient. Rounding the weights in the direction of the gradient may improve the accuracy of the neural network and also may reduce training time. Compared with generating a random value for performing stochastic rounding, using the sign of the operand requires less circuitry.

Parallel Processing Architecture

Figure 3:
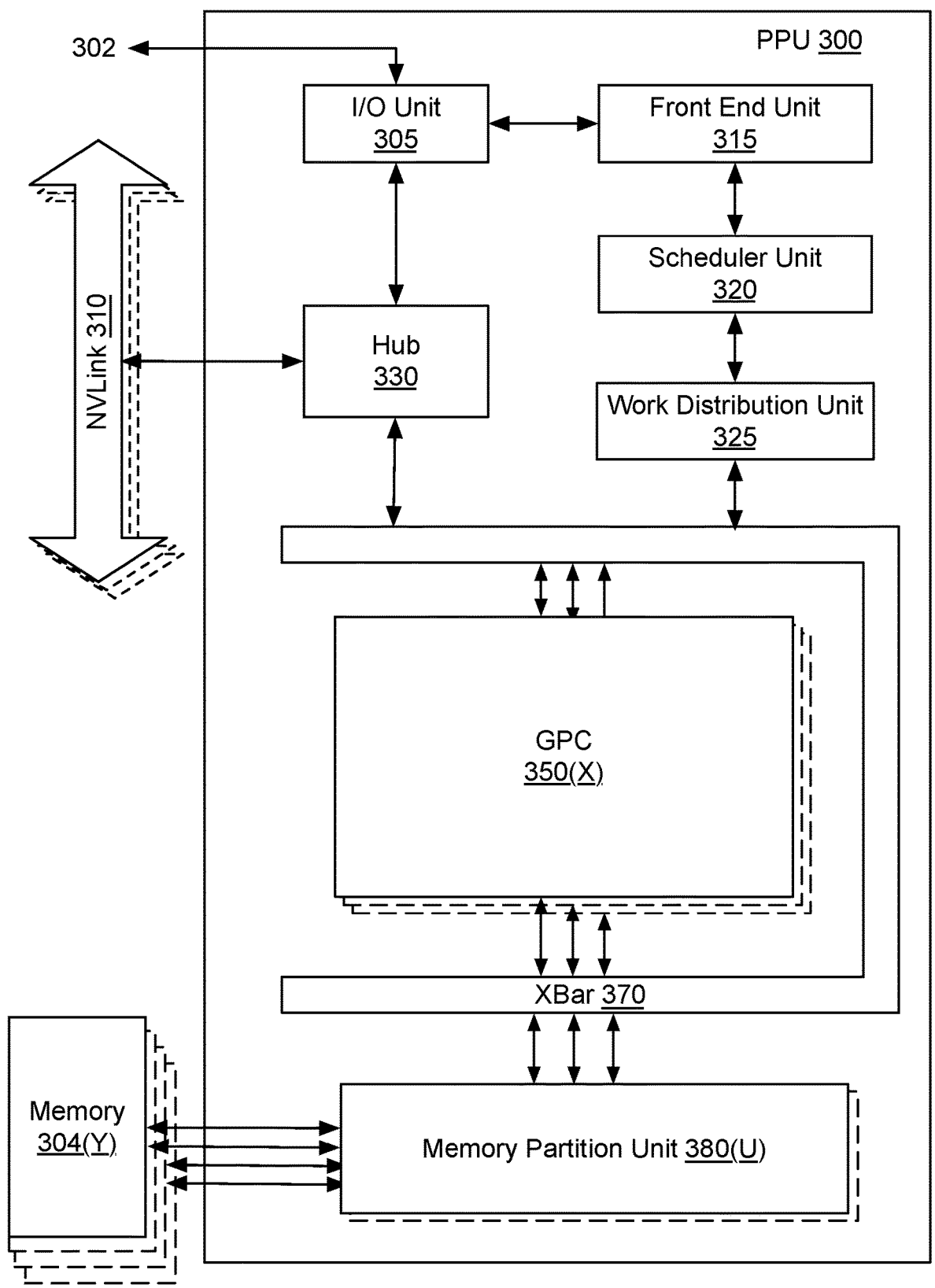
FIG. 3 illustrates a parallel processing unit, in accordance with one embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
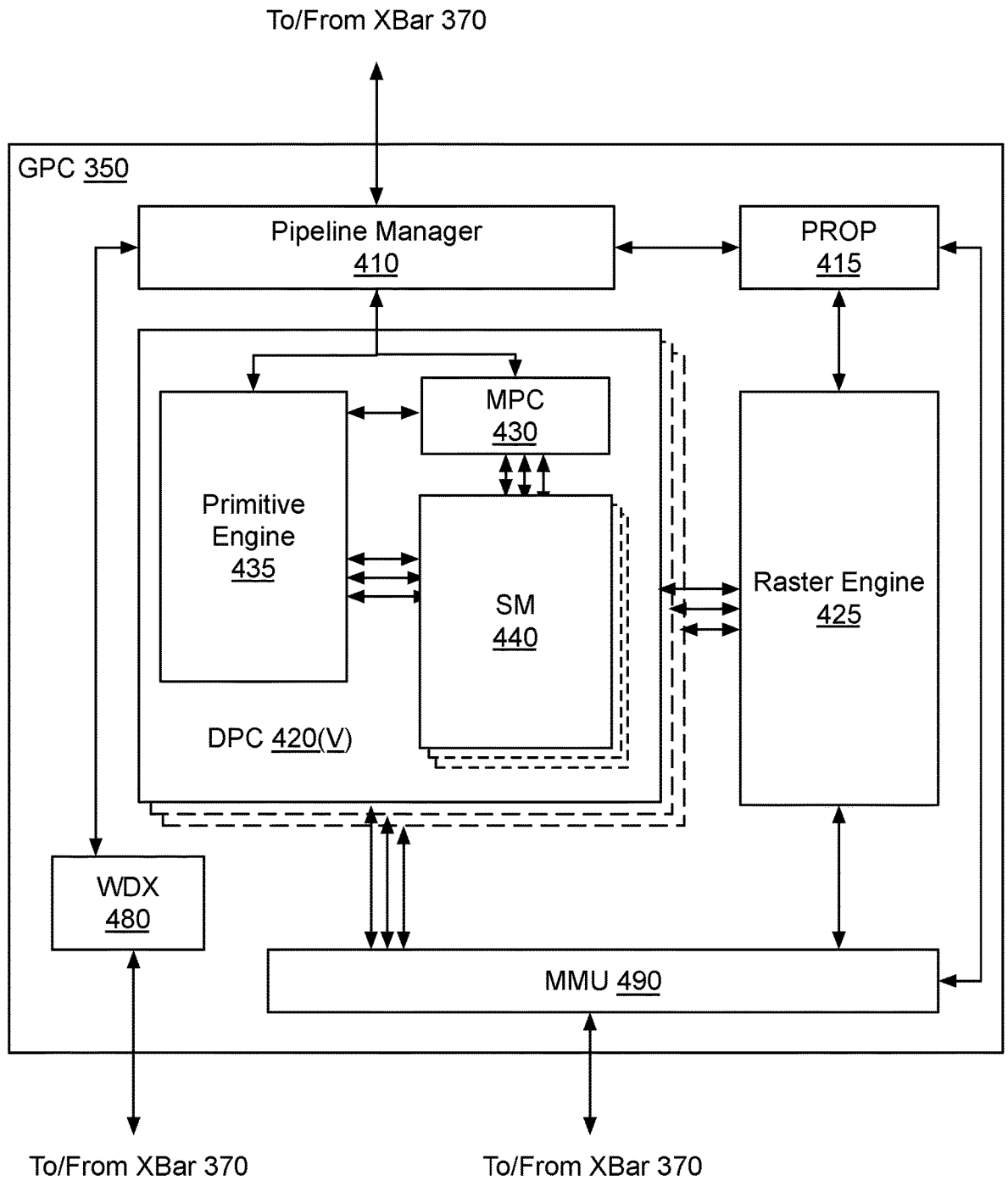
FIG. 4A illustrates a general processing cluster within the parallel processing unit of FIG. 3, in accordance with one embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
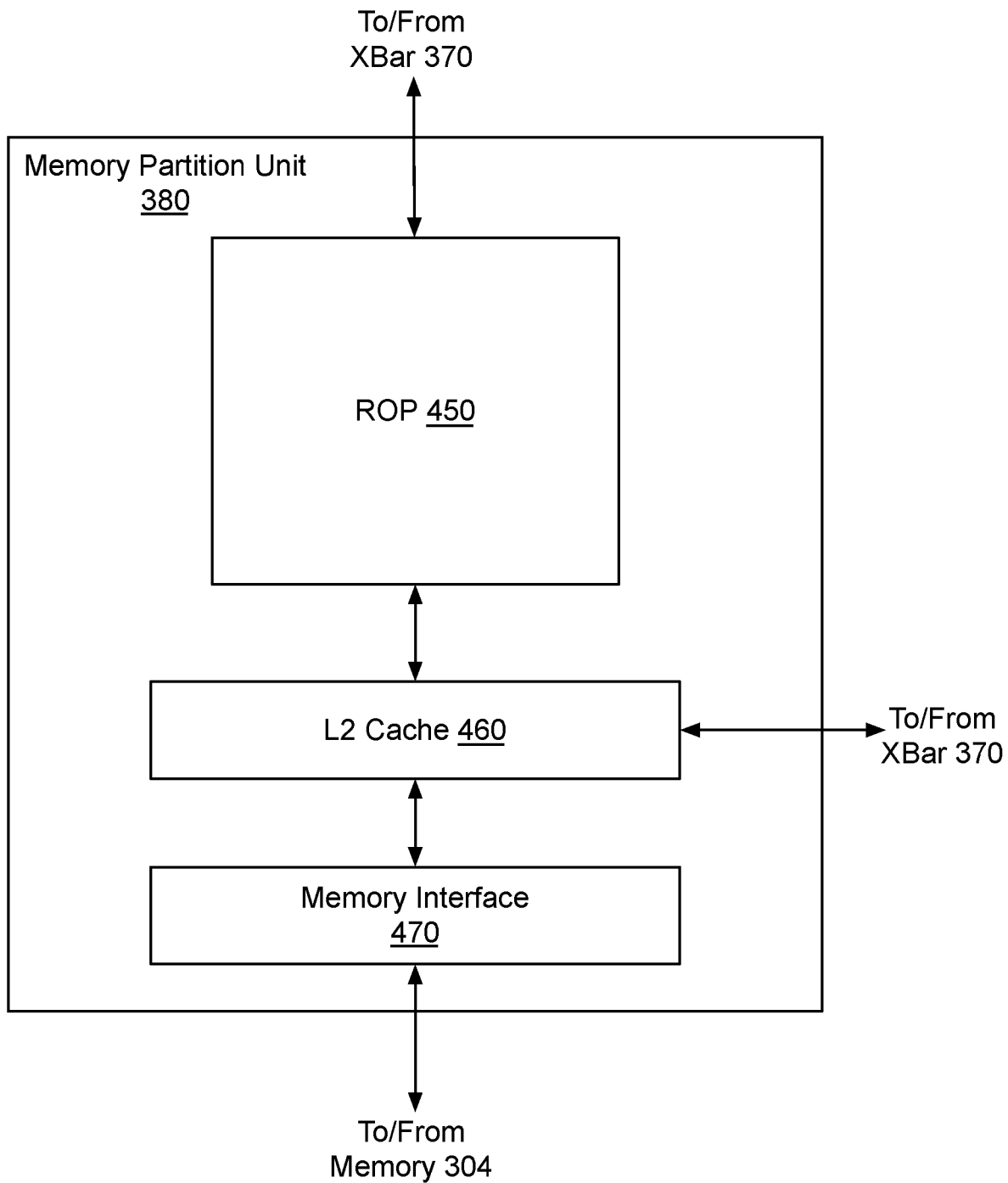
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In one embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In one embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
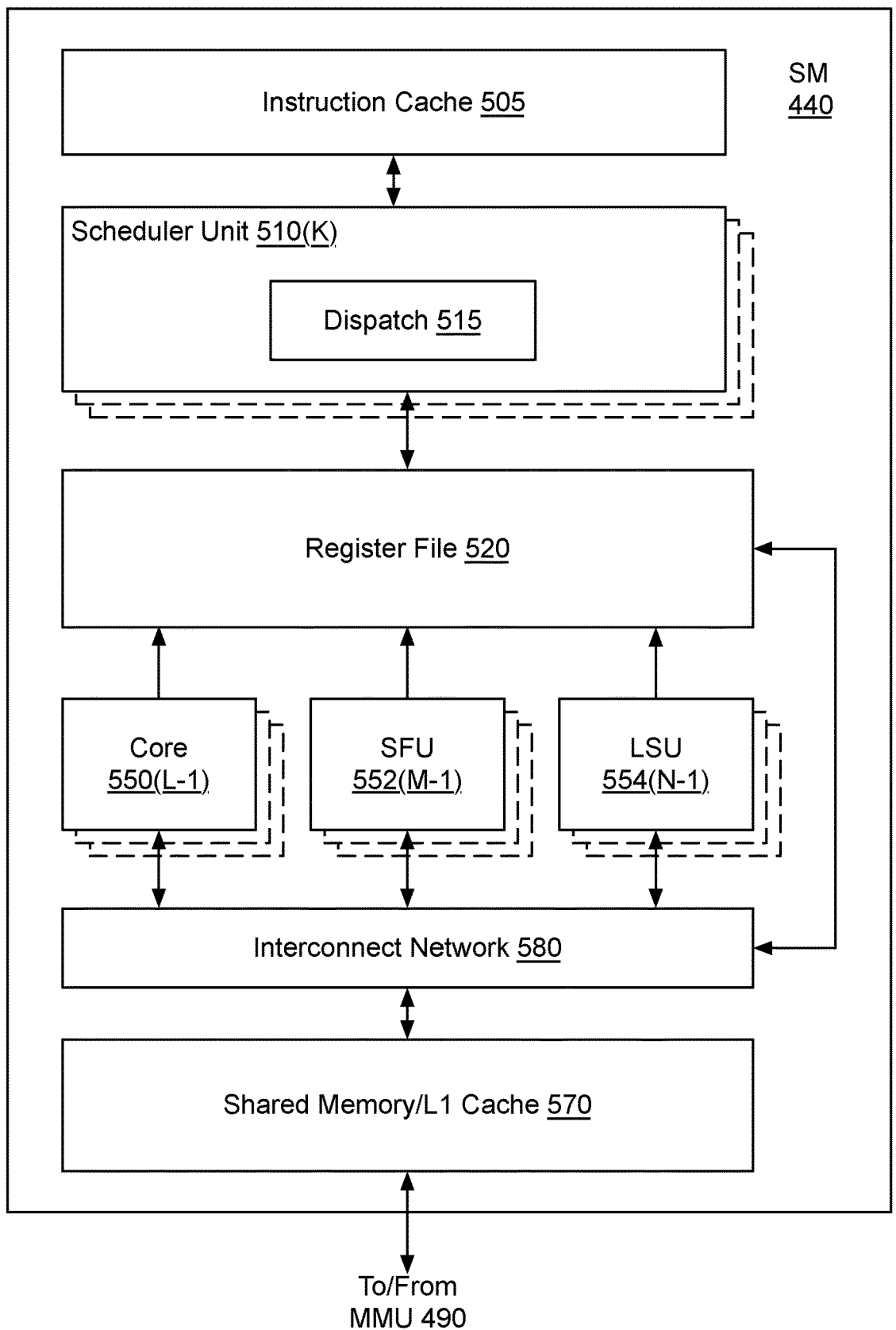
FIG. 5A illustrates the streaming multi-processor of FIG. 4A, in accordance with one embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In one embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores. In an embodiment, the cores 550 are configured to perform rounding operations using the method 100 or 200.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices. In an embodiment, the tensor cores are configured to perform rounding operations using the method 100 or 200.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 are configured to perform rounding operations using the method 100 or 200. In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In one embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
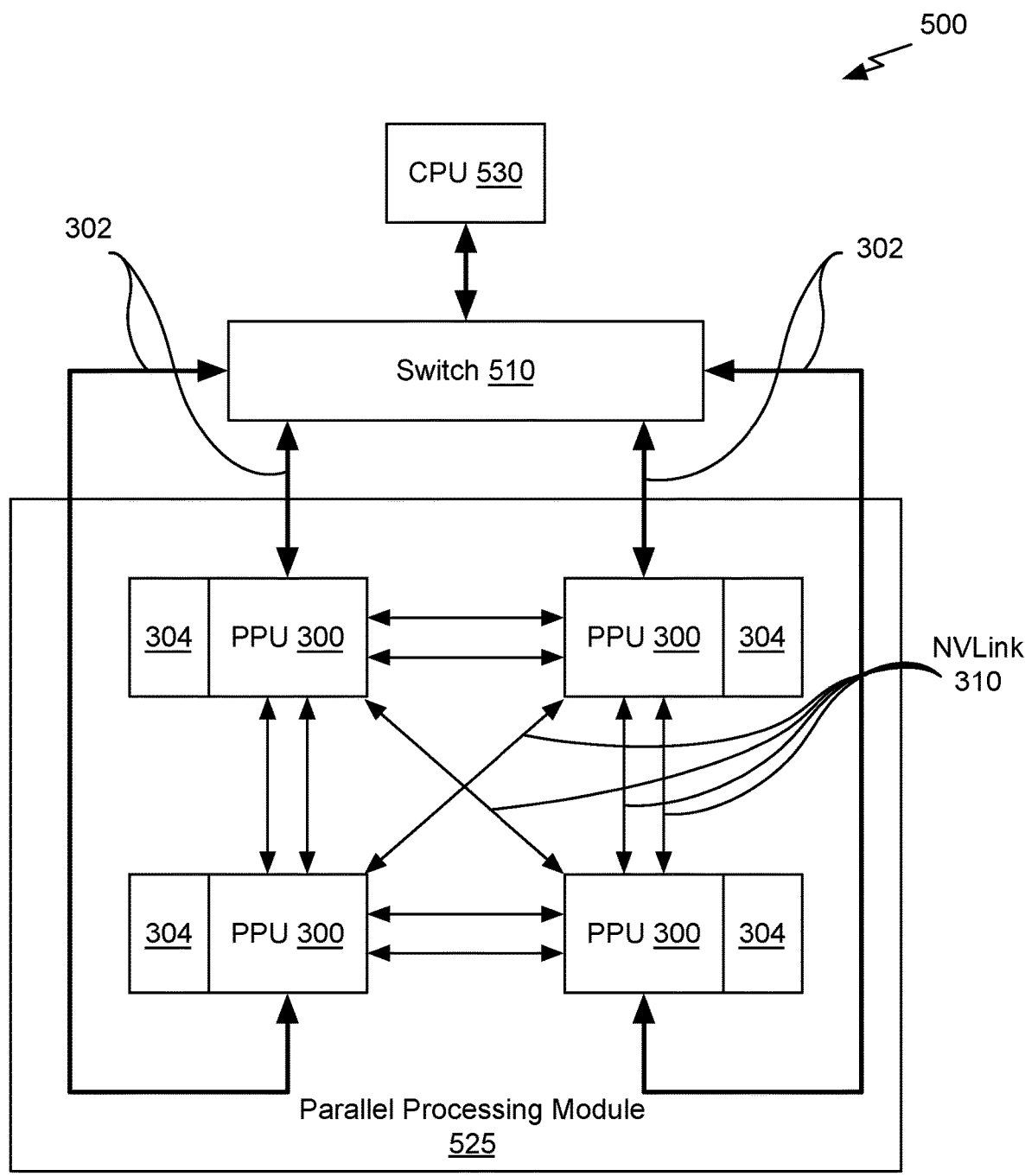
FIG. 5B is a conceptual diagram of a processing system implemented using the PPU of FIG. 3, in accordance with one embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In one embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In one embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
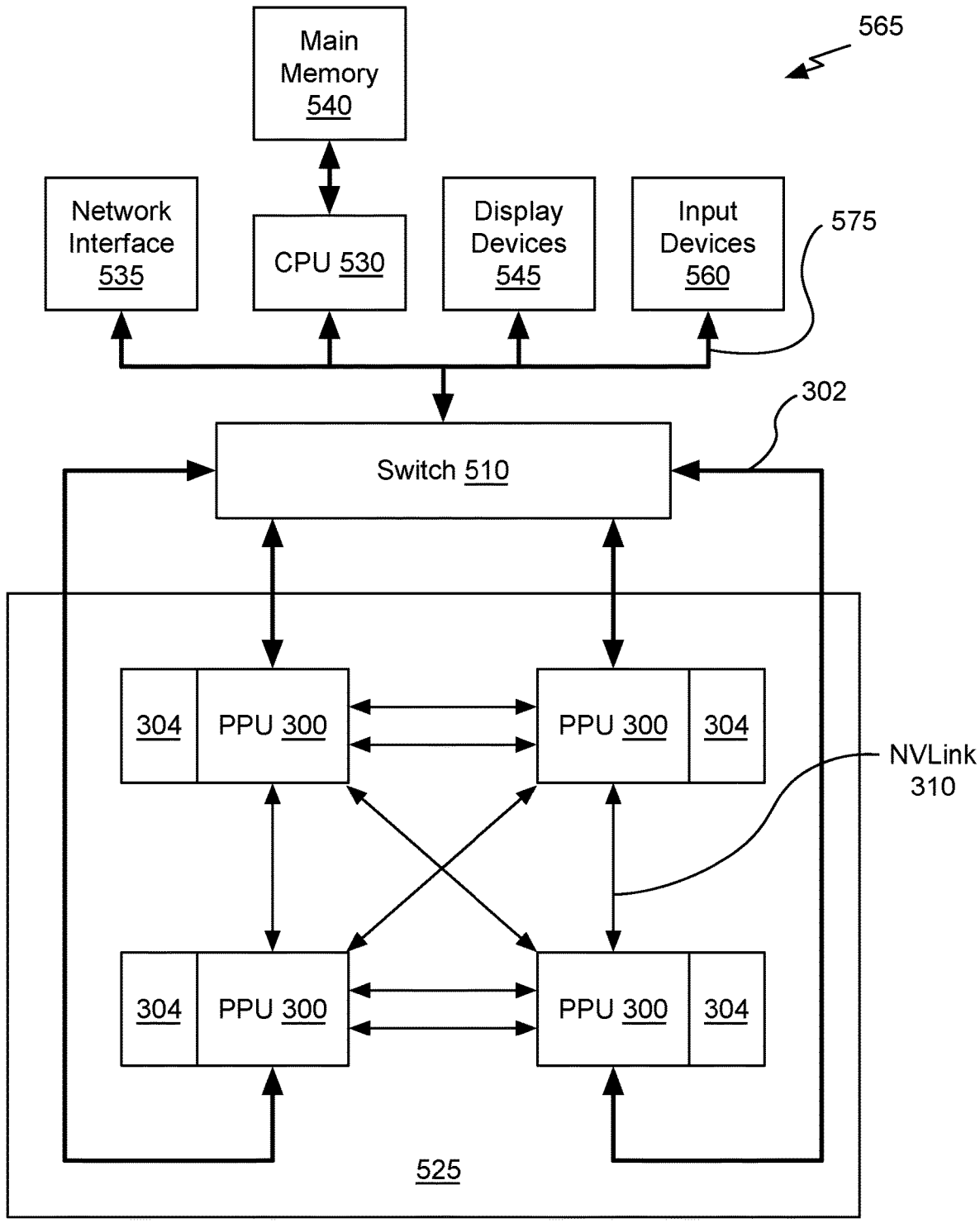
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1 or the method 260 shown in FIG. 2D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method to train a neural network, comprising:
receiving two or more floating point operands;
generating a floating point result based, at least in part, on at least one mathematical operation operating on the two or more floating point operands; and
rounding the floating point result in a direction corresponding to a sign of at least one of the floating point operands.

2. The method of claim 1, further comprising:
determining the at least one of the floating point operands equals zero; and
based on the determination, setting the rounded floating point result equal to the floating point result.

3. The method of claim 1, further comprising:
designating one of the floating point operands to be used for rounding; and
wherein the rounding comprises adding a unit of least precision to the floating point result if a sign of the designated floating point operand is positive and subtracting a unit of least precision from the floating point result if the sign is negative.

4. The method of claim 3, wherein the one of the floating point operands is indicated by an ordering of the floating point operands.

5. The method of claim 3, wherein the one of the floating point operands is indicated by a setting.

6. The method of claim 1, wherein the at least one of the floating point operands is an input to an arithmetic operation instruction.

7. The method of claim 1, wherein the at least one of the floating point operands is an expression.

8. A computer-implemented method to train a neural network, comprising:
receiving two or more floating point operands;
generating a floating point result based, at least in part, on at least one mathematical operation operating on the two or more floating point operands; and
rounding the floating point result in a direction corresponding to a sign of at least one of the floating point operands.

9. The method of claim 8, wherein the rounding comprises adding a unit of least precision to the floating point result if the value is within than a predetermined range.

10. The method of claim 8, wherein the rounding comprises subtracting a unit of least precision from the floating point result if the value is within than a predetermined range.

11. The method of claim 8, wherein the rounding comprises adding a lsb to the floating point result when the value is positive.

12. The method of claim 8, wherein the rounding comprises subtracting a lsb from the floating point result when the value is negative.

13. The method of claim 8, further comprising:
determining the value equals zero; and
based on the determination, setting the rounded floating point result equal to the floating point result.

14. The method of claim 8, further comprising:
determining the floating point result is represented exactly; and
based on the determination, setting the rounded floating point result equal to the floating point result.

15. The method of claim 8, further comprising outputting at least one signal based on the rounded floating point result, wherein the at least one signal is configured to be used to update one or more parameters of a neural network.

16. The method of claim 8, wherein generation of a random value is avoided in connection with the production of the rounded floating point result.

17. An apparatus, comprising:
a circuit to train a neural network, the circuit configured to:
receive two or more floating point operands;
generate a floating point result based, at least in part, on at least one mathematical operation operating on the two or more floating point operands; and
round the floating point result in a direction corresponding to a sign of at least one of the floating point operands.

18. The apparatus of claim 17, wherein the circuit is further configured to:
determine the floating point result is represented exactly; and
based on the determination, set the rounded floating point result equal to the floating point result.

19. The apparatus of claim 17, wherein the circuit is configured such that the rounding comprises rounding towards positive infinity if the sign of a designated floating point operand is positive.

20. The apparatus of claim 17, wherein the circuit is configured such that the rounding comprises rounding towards negative infinity if the sign of a designated floating point operand is negative.

21. The apparatus of claim 17, wherein the circuit is further configured to output at least one signal based on the rounded floating point result.

22. The apparatus of claim 21, wherein the circuit is configured such that the at least one signal is configured to be used to update one or more parameters of a neural network.

23. The apparatus of claim 17, wherein the floating point result is a mantissa of a floating point format number.

24. The apparatus of claim 17, further comprising normalizing the rounded floating point result to produce a mantissa of a floating point format number.

* * * * *